J. B. VAN DEWERKER.
Hop-Frame.

No. 63,119.

Patented Mar. 19, 1867.

Witnesses:
F. A. Jackson
J. A. Service

Inventor:
Jacob B. Van Dewerkin
Per Munn & Co.
Attorneys

United States Patent Office.

JACOB B. VAN DEWERKER, OF COBLESKILL, NEW YORK.

Letters Patent No. 63,119, dated March 19, 1867.

---

IMPROVEMENT IN HOP-FRAMES.

---

*The Schedule referred to in these Letters Patent and making part of the same.*

---

TO ALL WHOM IT MAY CONCERN:

Be it known that I, JACOB B. VAN DEWERKER, of Cobleskill, in the county of Schoharie, and State of New York, have invented a new and improved Hop-Frame; and I do hereby declare that the following is a full, clear, and exact description thereof, which will enable others skilled in the art to make and use the same, reference being had to the accompanying drawings, forming part of this specification.

This invention relates to a new and improved frame for training hops, and has for its object simplicity and economy in construction and facility in training the vines thereon, and in removing the bearing portions of the vines when in a proper condition to gather or harvest. In the accompanying drawings—

Figure 1:
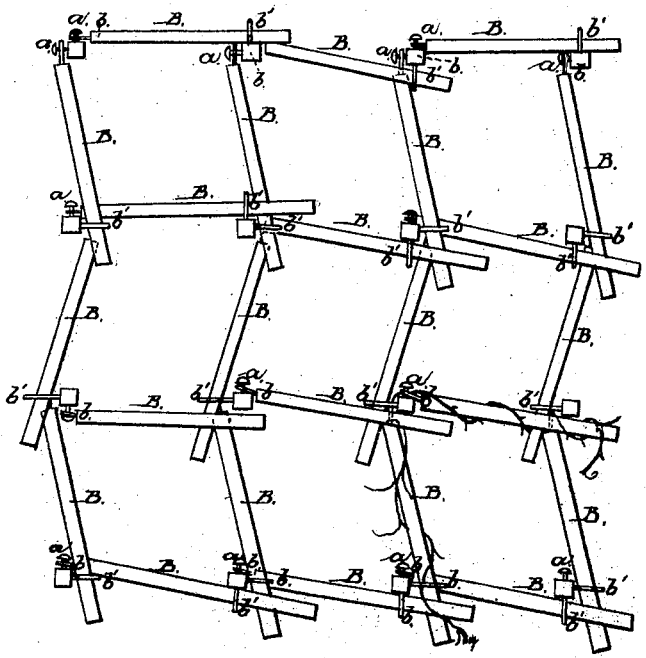

Figure 1 represents a plan or top view of my invention.

Figure 2:
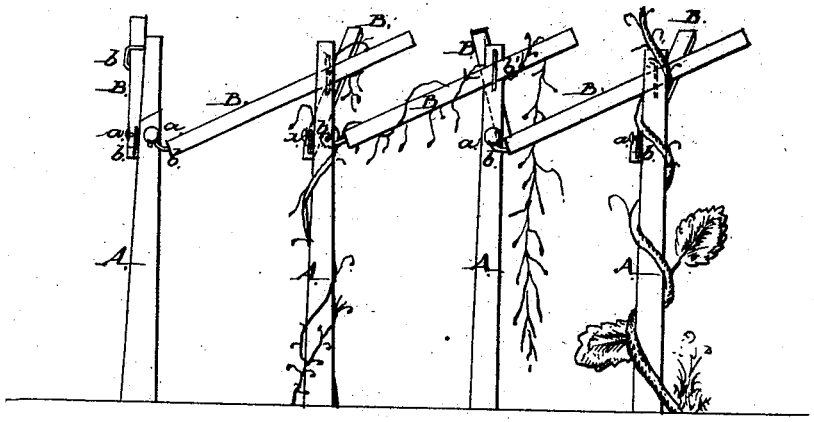

Figure 2, a side view of the same.

Similar letters of reference indicate like parts.

A represents stakes or poles, which are sunk vertically into the earth at equal distance apart in check-rows. These stakes or poles may be of any suitable wood and should be about equal in height. In each stake or pole, a short distance from the upper ends thereof, there are driven two nails, $a$, and on each nail one end of a bar, B, is supported by a hook, $b$, said bars being sustained near their outer ends by staples or hooks, $b'$, secured to two posts adjoining, the staples or hooks $b'$ being higher on the stakes or poles than the nails $a$, so as to give the bars B an inclined position. The two bars B project from each stake or pole nearly at right angles with each other, and said bars overlap each other and are also out of line with each other, as shown clearly in fig. 1.

Four hop vines are allowed to run up each stake or pole, that number generally constituting what is termed a hill, and when they reach the two bars B B, there are trained upon them two on each. If the vines have a tendency to grow beyond the bars B, they simply depend therefrom, as shown in fig. 1, the vines on one bar not interfering in the least with those on adjoining bars in consequence of the bars being out of line with each other. By this simple arrangement the sun and air have free access to all parts of every vine in a field. The framing is strong and durable, cannot be prostrated by the wind, and in harvesting the hops the bearing portions of the vines, which are all on the bars B may be readily removed by severing the vines at the junction of the bars B with the stakes or poles, and detaching and removing the bars B with the upper parts of the vines upon them, the lower parts of the vines being left on the roots. This improvement obviates the necessity of cutting the vines near the roots, which injures the latter, as the vines when thus cut bleed profusely and the roots are impoverished thereby.

Having thus described my invention, I claim as new, and desire to secure by Letters Patent—

A hop-frame composed of the vertical stakes or poles A, and inclined bars B, the latter being connected to the former, and arranged relatively therewith substantially as shown and described.

The above specification of my invention signed by me this 28th day of November, 1866.

J. B. VAN DEWERKER.

Witnesses:
WM. F. MCNAMARA,
ALEX. F. ROBERTS.